US009381701B1

(12) United States Patent
Dufort et al.

(10) Patent No.: US 9,381,701 B1
(45) Date of Patent: Jul. 5, 2016

(54) PRINTER AND METHOD FOR RELEASING THREE-DIMENSIONALLY PRINTED PARTS FROM A PLATEN USING ACTUATORS

(71) Applicant: Xerox Corporation, Norwalk, CT (US)

(72) Inventors: Ron E. Dufort, Rochester, NY (US); John T. Buzzelli, Walworth, NY (US); Dara N. Lubin, Pittsford, NY (US); Kevin St. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/677,223

(22) Filed: Apr. 2, 2015

(51) Int. Cl.

| | |
|---|---|
| ***B33Y 10/00*** | (2015.01) |
| ***B29C 67/00*** | (2006.01) |
| *B33Y 30/00* | (2015.01) |
| *B33Y 50/02* | (2015.01) |

(52) U.S. Cl.
CPC ......... *B29C 67/0085* (2013.01); *B29C 67/0055* (2013.01); *B29C 67/0088* (2013.01); *B33Y 10/00* (2014.12); *B33Y 30/00* (2014.12); *B33Y 50/02* (2014.12)

(58) Field of Classification Search
CPC ........ B33Y 10/00; B33Y 30/00; B33Y 40/00; B33Y 50/00; B33Y 50/02; B33Y 70/00; B33Y 80/00; B33Y 99/00
See application file for complete search history.

(56) References Cited

U.S. PATENT DOCUMENTS 4,052,217 A 10/1977 Watkinson
5,094,095 A 3/1992 Barrois et al.
5,141,680 A 8/1992 Almquist et al.
6,269,938 B1 8/2001 Lutz
6,571,702 B2 6/2003 Wotton et al.
8,911,199 B2 12/2014 Herrmann et al.
9,090,113 B1 * 7/2015 Foley ..................... B41J 29/393
2009/0190969 A1 * 7/2009 Mestha ................ G03G 15/344 399/266
2012/0286944 A1 * 11/2012 Forutanpour ....... G06F 3/04847 340/407.1
2014/0220168 A1 8/2014 Perez et al.
2014/0265032 A1 9/2014 Teicher et al.
2015/0014885 A1 * 1/2015 Hofmann ............ B29C 67/0055 264/294
2015/0086728 A1 * 3/2015 Chen .................. B29C 67/0059 427/553
2015/0165739 A1 * 6/2015 Taniuchi .............. C29D 11/322 156/62.2
2015/0210011 A1 * 7/2015 Conrow ............. B29C 67/0088 264/40.4
2015/0367417 A1 * 12/2015 Buller ................... B22F 3/1055 419/53

* cited by examiner

*Primary Examiner* — David Banh
(74) *Attorney, Agent, or Firm* — Maginot Moore & Beck LLP

(57) ABSTRACT

A three-dimensional object printer includes an actuator that contacts a surface of a platen in the printer. A controller selectively operates the actuator to apply force to a bottom layer of a three-dimensional object formed on the platen to break an adhesion between the bottom layer and the platen.

11 Claims, 3 Drawing Sheets

100
EJECTOR HEAD 108
116 112 104
140
124
128
120
ACTUATOR
CONTROLLER
SWITCH
VOLTAGE SOURCE
132
136

PRINTER AND METHOD FOR RELEASING THREE-DIMENSIONALLY PRINTED PARTS FROM A PLATEN USING ACTUATORS

TECHNICAL FIELD

The device and method disclosed in this document relates to three-dimensional object printing and, more particularly, to removal of a three-dimensional object from a platen on which the object was formed by printing.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. Automation has provided for higher speed and more efficient processing of three-dimensional printed parts. One area of concern relates to removal of the three-dimensional printed part from the build platen. Often the three-dimensional printed part sticks to the build platen and can be challenging to remove. Current methods for part removal include heating, impacting, scraping, and freezing. These methods are generally cumbersome, time consuming, and risk damaging the part or the build platen. What is needed is a method for removing a three-dimensional printed part from a build platen that is fast, reliable, and easily automated.

SUMMARY

A three-dimensional object printer facilitates the release of three-dimensional objects from a platen in the printer. The printer includes a platen having a first surface and a second surface, an ejector head having at least one ejector configured to eject material onto the first surface of the platen, an actuator positioned to contact the platen, and a controller operatively connected to the actuator and the ejector head. The controller is configured to operate the ejector head to eject material onto the first surface of the platen to form a three-dimensional object, and operate the actuator to apply a force to a bottom layer of the three-dimensional object and break adhesion between the bottom layer of the three-dimensional object and the platen.

A method of manufacturing a three-dimensional object facilitates the release of three-dimensional objects from a platen in the printer. The method includes operating with a controller an ejector head to eject material onto a first surface of the platen to form the three-dimensional object on the first surface of the platen, operating with the controller an actuator that contacts the platen to apply a force to a bottom layer of the three-dimensional object and break adhesion between the bottom layer of the three-dimensional object and the platen.

Another embodiment of a three-dimensional object printer facilitates the release of three-dimensional objects from a surface on which a three-dimensional object is formed in the printer. This embodiment of the printer includes a planar actuator having a first surface and a second surface, an ejector head having at least one ejector configured to eject material onto the first surface of the planar actuator, and a controller operatively connected to the planar actuator and the ejector head. The controller is configured to operate the ejector head to eject material onto the first surface of the planar actuator to form a three-dimensional object, and deliver an electrical signal to the planar actuator to bend the planar actuator and release the three-dimensional object from the planar actuator.

BRIEF DESCRIPTION OF THE DRAWINGS

The foregoing aspects and other features of the printer and method are explained in the following description, taken in connection with the accompanying drawings.

DETAILED DESCRIPTION

Figure 1:
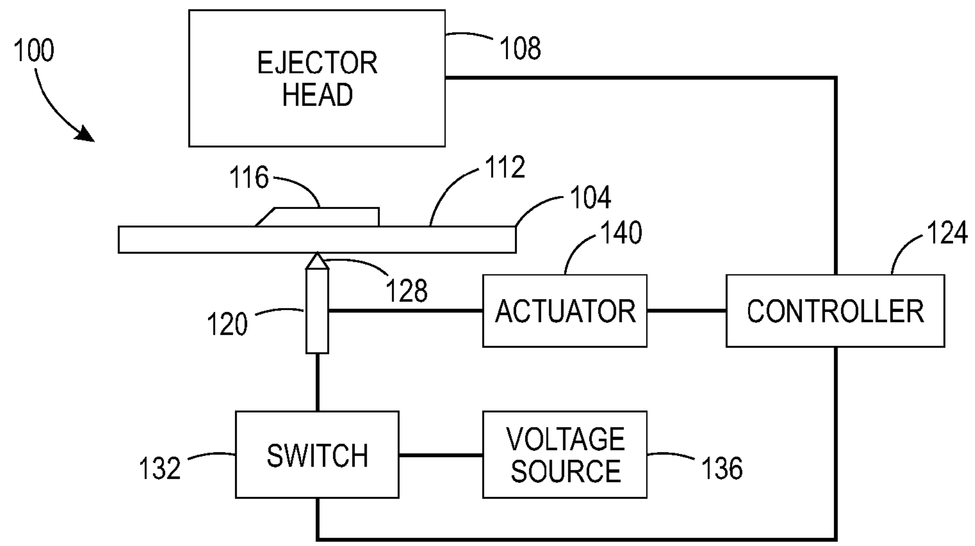
FIG. 1 shows a three-dimensional object printer with a platen that incorporates a stack actuator for object release.

For a general understanding of the environment for the printer and method disclosed herein as well as the details for the printer and method, reference is made to the drawings. In the drawings, like reference numerals designate like elements.

FIG. 1 shows a three-dimensional object printer 100. The printer 100 comprises a platen 104 and an ejector head 108. The ejector head 108 has a plurality of ejectors configured to eject material onto a surface 112 of the platen 104. A controller 124 operates the ejectors in the ejector head 108 to form a three-dimensional object, such as the part 116, on the platen 104. In some embodiments, the ejector head has a first plurality of ejectors configured to eject a build material and a second plurality of ejectors configured to eject a support material, such as wax. The printer 100 includes a stack actuator 120 that is positioned to enable a movable member 128 of the stack actuator 120 to remain in contact with the platen 104. While FIG. 1 depicts the stack actuator as being located beneath the platen 104, in some embodiments, the stack actuator is positioned so the movable member contact the side of the platen 104 and, in other embodiments, it is positioned so the movable member contacts the upper surface 112 of the platen 104. The controller is further configured to operate a switch 132 to connect the stack actuator 120 to a voltage source 136 selectively. The controller 124 in some embodiments is also operatively connected to an actuator 140 and the controller is further configured to operate the actuator 140 to move the stack actuator 120 to different positions along a surface of the platen 104.

Figure 2:
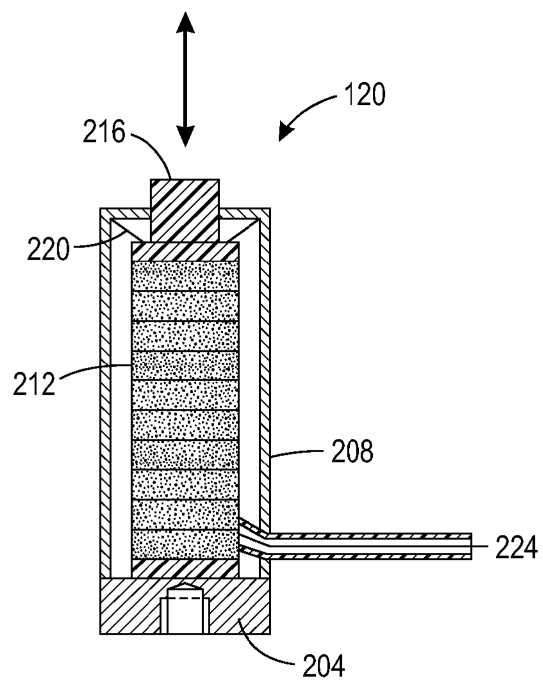
FIG. 2 is a cross-sectional view of a stack actuator that can be used in the printer of FIG. 1.

The stack actuator 120, in one embodiment, is a piezoelectric device. A cross-sectional view of the stack actuator 120 is depicted in FIG. 2. The actuator 120 includes a base 204, a housing 208, a stack of circular piezoelectric ceramic disks 212, a movable member 128, a flexible biasing member 220, and an electrode connection 224. Although the disks forming the layers of the actuator 120 are shown as being circular, other shapes can be used as well. The housing 208 and base 204 are typically metal, although other materials can be used. The piezoelectric layers in the stack 212 are separated from one another by an electrically insulating layer. When the voltage source 136 is connected the layers in the stack 212 through electrode connection 224, the piezoelectric ceramic material bends in the axial dimension of housing 208 to urge the movable member 128 against the flexible biasing member 220 so the movable member exerts a force against a surface of the platen 104. When the voltage source is disconnected from the actuator 120, the movable member is returned to its original position by the flexible biasing member 220. Thus, by selectively connecting the voltage source 136 to the stack of piezoelectric layers 212, the movable member 128 vibrates the platen 104. This vibration breaks the adhesion between the bottom material in part 116 and the platen 104 so the part 116 can be removed from the platen more easily. In one embodiment, the stack actuator 120 is Part No. 45-1090 available from APC International, Ltd. of Mackeyville, Pa. This stack actuator can vibrate at a frequency of 150 kHz and exert a force of up to 300 newtons. Other models of the stack actuator from APC International can exert larger forces and be operated at different frequencies. The piezoelectric stack actuators provide the benefits of a quick response time, power consumption only during activation, and compact design. Nevertheless, other types of actuators can be used such as electrical actuators with a reciprocating drive, pneumatic actuators and the like.

Figure 3:
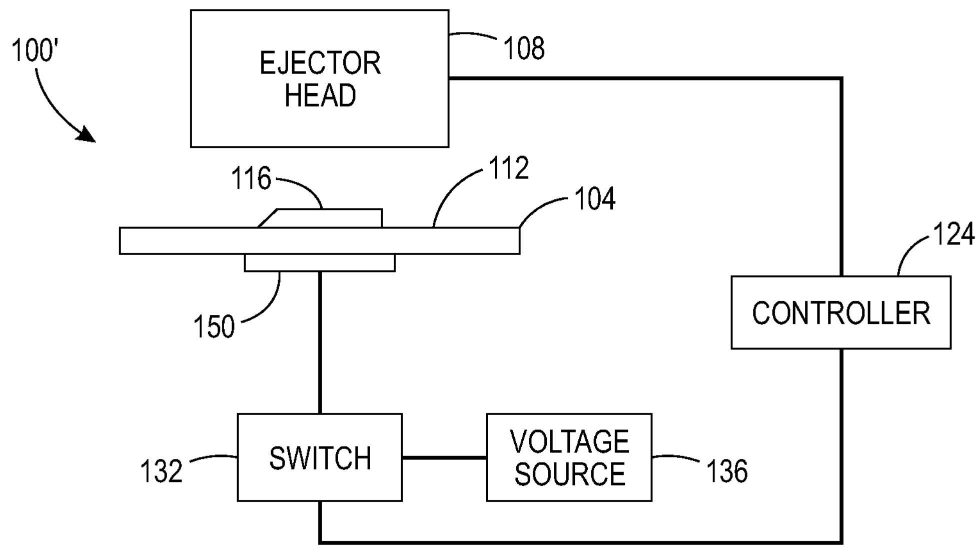
FIG. 3 shows another three-dimensional object printer having a platen that incorporates a strip actuator for object release.

Another embodiment of a printer that exerts force against a platen to facilitate removal of a part is shown in FIG. 3. Using like reference numbers for like components, the printer 100' includes platen 104, ejector head 108, controller 124, switch 132, and voltage source 136. Instead of stack actuator 120, however, one or more strip actuators 150 are bonded to a surface of the platen 104. As depicted in FIG. 3, the strip actuators 150 are bonded to the lower surface of platen 104 opposite the area on which the part 116 is formed, although the actuators 150 can be mounted can be mounted to the upper surface of platen 104. The controller 124 is configured as described above to operate ejectors in the ejector head 108 to form the part 116 on the upper surface 112 of the platen 104. The controller 124 is also configured to operate the switch 132 as described above to connect the strip actuator(s) 150 to the voltage source 136 selectively. One difference between the embodiment of FIG. 1 and FIG. 3 is the flexibility of the platen 104. Since a strip actuator bends, then the platen 104 should be flexible enough to bend with the actuator to release the object. The platen used with a stack actuator, however, can be more rigid since the platen transmits the vibration produced by the stack actuator and is not required to bend.

Figure 4:
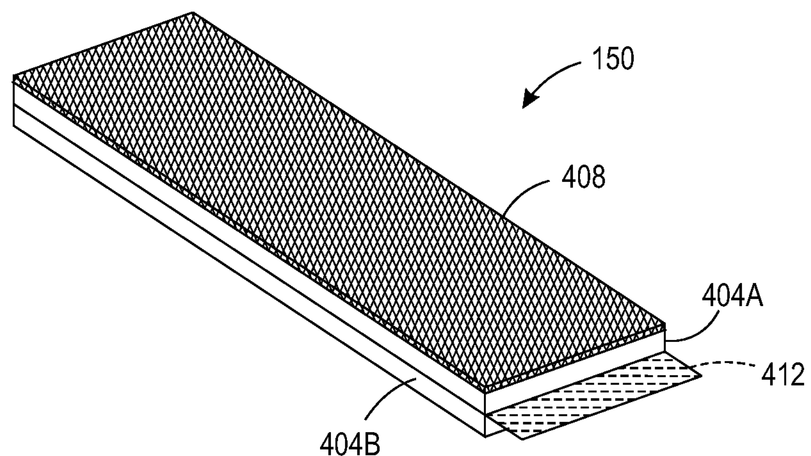
FIG. 4 is a schematic view of a strip actuator that can be used in the printer of FIG. 3.

A strip actuator 150 is shown in FIG. 4. The actuator 150 includes two strips 404*a* and 404*b* of piezoelectric ceramic material, which are bonded together so the direction of polarization of the two strips coincides. The two strips are electrically connected in parallel. An electrode 412 is positioned between the two strips to enable the strips to be electrically connected to the voltage source 136 through the switch 132. The outside surfaces of the strips 404*a* and 404*b* are covered in an electrically insulating layer 408, such as varnish. When the voltage source is applied to the strips, one ceramic layer expands and the other contracts. This action causes the actuator to flex. When the strip actuator 150 is bonded to a surface of the platen 104, the bending of the actuator 150 applies a force to the platen, which bends in response to the deflection of the actuator. The bending of the platen breaks the adhesion between the bottom layer of the part 116 and the upper surface 112 of the platen 104 so the part can be removed from the platen more easily. The surface of the strip actuator that is bonded to the platen surface can be bonded with adhesive or solder, although the solder joints can break from mechanical fatigue. Use of an epoxy or acrylate glue is probably more reliable in most environments.

FIG. 4 depicts the structure of one type of strip actuator. In other embodiments, the strip actuator is a planar member made of macro fiber composite (MFC) material. This type of material responds to an electrical signal in a manner similar to the piezoelectric material of the strip actuator shown in FIG. 4. Thus, by adhering a sheet of MFC material to a platen, an electrical signal can be delivered to the sheet to bend the platen as described above with respect to strip actuator of FIG. 4. In another embodiment, the platen is made with a planar actuator that is electrically connected to an electrical signal generator that delivers an electrical signal to the planar actuator to cause the planar actuator to bend and release the object formed on the planar actuator. In this last embodiment, the structure shown in FIG. 3 is modified to remove the actuator 150 so the electrical signal is delivered directly to the planar actuator to cause the planar actuator to bend and release the three-dimensional object from the planar actuator. In this last discussed embodiment, the planar actuator can be formed with MFC material or as a single or plurality of strip actuators.

Figure 5:
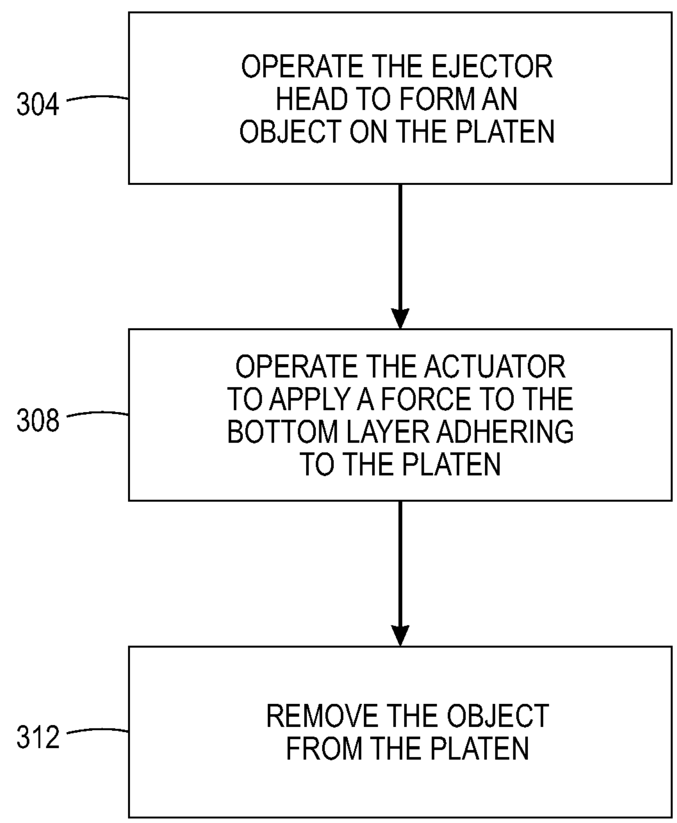
FIG. 5 shows a method for releasing an object from a platen in a three-dimensional object printer.

A method 300 for operating a printer 100 having either a stack actuator 120 or a strip actuator 150 to facilitate release of printed parts from the platen 104 is shown in FIG. 5. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein.

When the method 300 is performed it begins with the controller 124 operating ejectors in the ejector head 108 to form a three-dimensional part 116 on a platen 104 (block 304). After a part is formed on the platen, the controller 124 or other circuitry implementing the method 300 operates an actuator to apply a force at the bottom layer of the part 116 to break the adhesion between the bottom layer and the platen (block 308). In one embodiment, the controller 124 selectively operates switch 132 to apply a voltage to the stack actuator 120 to vibrate the platen 104. In the other embodiment, the controller 124 selectively operates switch 132 to apply a voltage to the strip actuator 150 to bend the actuator and the platen 104. Thereafter, the part 116 can be removed from the platen 104, for example, with a robotic arm, an actuator tilting the platen 104 or other known removal method (block 312).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:

a platen having a first surface and a second surface;

an ejector head having at least one ejector configured to eject material onto the first surface of the platen;

a stack actuator positioned to contact the platen;

another actuator operatively connected to the stack actuator; and a controller operatively connected to the actuator and the ejector head, the controller being configured to:

operate the ejector head to eject material onto the first surface of the platen to form a three-dimensional object; and operate the stack actuator to apply a force to a bottom layer of the three-dimensional object, produce a vibration in the platen, and operate the other actuator to move the stack actuator along the second surface of the platen as the stack actuator produces vibration in the platen to break adhesion between the bottom layer of the three-dimensional object and the platen.

2. The printer of claim 1 wherein the stack actuator is a piezoelectric stack actuator.

3. The printer of claim 1 wherein the stack actuator essentially consists of macro fiber composite material.

4. The printer of claim 1 further comprising:

a switch operatively connected to the stack actuator;

a voltage source operatively connected to the switch; and the controller being further configured to operate the switch to connect the voltage source to the stack actuator selectively to operate the stack actuator and apply force to the bottom layer of the three-dimensional object.

5. A method of releasing a three-dimensional object from a platen in a printer comprising:

operating with a controller an ejector head to eject material onto a first surface of the platen to form the three-dimensional object on the first surface of the platen;

operating with the controller a stack actuator that contacts the platen to apply a force to a bottom layer of the three-dimensional object and produce a vibration in the platen to break adhesion between the bottom layer of the three-dimensional object and the platen; and operating another actuator with the controller to move the stack actuator along a second surface of the platen as the stack actuator produces vibration in the platen.

6. The method of claim 5 wherein the operation of the actuator further comprises:

operating a piezoelectric stack actuator with the controller to produce a vibration in the platen.

7. The method of claim 5, the operation of the stack actuator further comprising:

operating a switch with the controller to connect a voltage source to the stack actuator selectively to operate the stack actuator and produce vibration in the platen.

8. A three-dimensional object printer comprising:

a planar actuator having a first surface and a second surface;

an ejector head having at least one ejector configured to eject material onto the first surface of the planar actuator; and a controller operatively connected to the planar actuator and the ejector head, the controller being configured to:

operate the ejector head to eject material onto the first surface of the planar actuator to form a three-dimensional object; and deliver an electrical signal to the planar actuator to bend the planar actuator and release the three-dimensional object from the planar actuator.

9. The three-dimensional object printer of claim 8 wherein the planar actuator consists essentially of macro fiber composite material.

10. The three-dimensional object printer of claim 8 wherein the planar actuator is a strip actuator.

11. The three-dimensional object printer of claim 8 wherein the planar actuator is a plurality of strip actuators.

* * * * *